(12) United States Patent
Al-Mufti et al.

(10) Patent No.: US 12,699,177 B2
(45) Date of Patent: Aug. 4, 2026

(54) GEOLOCATION BY MEASURING ROUNDTRIP TIME WITHIN RU

(71) Applicant: DISH WIRELESS L.L.C., Englewood, CO (US)

(72) Inventors: Khalid W. Al-Mufti, Sterling, VA (US); Mehdi Alasti, Reston, VA (US)

(73) Assignee: DISH Wireless L.L.C., Englewood, CO (US)

( * ) Notice: Subject to any disclaimer, the term of this patent is extended or adjusted under 35 U.S.C. 154(b) by 609 days.

(21) Appl. No.: 18/091,151

(22) Filed: Dec. 29, 2022

(65) Prior Publication Data

US 2024/0219558 A1     Jul. 4, 2024

(51) Int. Cl.
*G01S 13/76*     (2006.01)
*H04W 76/10*     (2018.01)

(52) U.S. Cl.
CPC ........... *G01S 13/765* (2013.01); *H04W 76/10* (2018.02)

(58) Field of Classification Search
CPC ...... G01S 13/765; G01S 7/006; H04W 76/10; H04W 64/00
See application file for complete search history.

(56) References Cited

U.S. PATENT DOCUMENTS

| | | | |
|---|---|---|---|
| 5,365,516 A | 11/1994 | Jandrell | |
| 5,592,180 A | 1/1997 | Yokev et al. | |
| 5,809,424 A | 9/1998 | Eizenhoefer | |

| | | | |
|---|---|---|---|
| 7,966,023 B2 | 6/2011 | Fiorillo et al. | |
| 8,160,609 B2 | 4/2012 | Alles et al. | |
| 12,041,578 B2 * | 7/2024 | Edge | H04L 5/0051 |
| 2011/0170444 A1 | 7/2011 | Alles et al. | |
| 2022/0021423 A1 | 1/2022 | Ahmed et al. | |
| 2022/0132304 A1 | 4/2022 | Bye et al. | |
| 2022/0141876 A1 | 5/2022 | Gorain et al. | |
| 2023/0055972 A1 * | 2/2023 | Ben-Shachar | G01S 13/765 |
| 2023/0247580 A1 * | 8/2023 | Dong | H04L 5/0032 370/329 |

(Continued)

OTHER PUBLICATIONS

"The 5G Evolution: 3GPP Release 16-17," 5G Americas, Jan. 2020. (54 pages).

(Continued)

*Primary Examiner* — Resha Desai
*Assistant Examiner* — Naomi M Wolford
(74) *Attorney, Agent, or Firm* — Jeremiah J. Baunach; Frontier IP Law PLLC

(57)     ABSTRACT

An approach for estimating Round Trip Time (RTT) such as used for estimating a location of mobile User Equipment (UE) devices, particularly adapted for Open Radio Access Networks (O-RANs) that disaggregate basestation functions into a Radio Unit (RU) and a Distributed Unit (DU) or Central Unit (CU). A Positioning Reference Signal (PRS) is transmitted by the RU according to schedule determined by the DU or CU. A Sounding Reference Signal (SRS) is returned by the UE to the DU or CU, with an estimate by the UE of its internal delay. The RU reports an estimate of the difference seen between a time of transmission of the PRS and time of reception of the SRS. The RTT is then estimated by subtracting the UE's internal delay from this difference. RTTs taken between the UE and two or more RU's may further determine a location of the UE.

16 Claims, 4 Drawing Sheets

(56)     References Cited

U.S. PATENT DOCUMENTS

2024/0007985 A1*  1/2024  Potharaju .......... H04W 72/0446
2024/0147399 A1*  5/2024  Zorgui ................. H04J 3/0682

OTHER PUBLICATIONS

Swales et al., "Direction finding in the cellular land mobile radio environment," 1989 Fifth International Conference on Radio Receivers and Associated Systems, Cambridge, UK, 1990, pp. 192-196. (5 pages).
Dryjanski, "Introduction to O-RAN," Rimedo Labs, Mar. 10, 2021. (8 pages).
Rcrwireless, "Open RAN 101-RU, DU, CU: Why, what, how, when?" Jul. 8, 2020. (8 pages).
Dryjanski, "O-RAN Architecture, Nodes, and Interfaces," Rimedo Labs, Apr. 1, 2021. (6 pages).
"5G; Ng Radio Access Network (NG-RAN); Stage 2 functional specification of User Equipment (UE) position in NG-RAN, (3GPP TS 38.305 version 16.1.0, Release 16)", 3GPP 5G A Global Initiative, ETSI TS 138 305 V16.1.0, Jul. 2020. (117 pages).
Radnosrati et al., "Localization in 3GPP LTE Based on One RTT and One TDOA Observation," in IEEE Transactions on Vehicular Technology, vol. 69, No. 3, pp. 3399-3411, Mar. 2020. (13 pages).

* cited by examiner

GEOLOCATION BY MEASURING ROUNDTRIP TIME WITHIN RU

TECHNICAL FIELD

This patent relates to mobile wireless communication systems, and more particularly relates to location of mobile devices.

BACKGROUND

The Third Generation Partnership Project (3GPP) working group continuously provides enhancements to what is now known as the 5G Advanced wireless communication specification. Recent enhancements have included new frequency bands, energy savings, greater network coverage, mobility improvements, location services and other features.

3GPP Release 16 specifies several different mechanisms to implement location services. One such method is called Assisted Global Positioning System (A-GPS). In A-GPS, the network operator deploys cache servers for storing orbital information downloaded at each cell site from GPS satellites. An A-GPS-capable mobile device can then connect to these servers to obtain its position. Even when the device has its own GPS chip, the availability of such additional A-GPS data can improve the accuracy of position estimates.

Some devices do not have their own GPS receivers. Other situations, such as lawful intercept, should not rely on the fact that a device's own GPS hasn't been disabled or tampered with. Therefore 3GPP Release 16 also specifies a couple of other ways, Time Difference of Arrival (TDOA), and Round Trip Time (RTT), to locate a mobile device that are not dependent on the availability of a GPS. For TDOA, the mobile device reports an observed time difference in the arrival time of a downlink signal transmitted by two or more base stations. For RTT, the base station measures a round trip time delay between when it transmits a signal to the mobile and receives a response. Round Trip Time (RTT) based geolocation techniques are often considered more desirable due to there being less ambiguity when the number of available base stations is limited.

Recent developments by the Open RAN Alliance introduce a proposed modification to the traditional 3GPP Radio Access Network (RAN) architecture. The legacy architecture suggests the base station is a closed "black box" where any internal interfaces are vendor-specific. Moving towards Open RAN (O-RAN) disaggregates the different functions of a base station radio into various functional blocks. These functional blocks may include a Central Unit (CU), a Distributed Unit (DU) and a Radio Unit (RU). These different functional blocks utilize open interfaces to communicate including the so-called Open Fronthaul (FH), F1, E2, A1 and other interfaces. In addition, a RAN Intelligent Controller (RIC) function allows these entities to reach management interfaces, such as Radio Resource Management (RRM) or Self-Organizing Network (SON) functions to further control the radio resources and network operation.

SUMMARY OF PREFERRED EMBODIMENTS

The mobile location techniques described herein are particularly adapted to O-RAN base station architectures. More particularly, a wireless network may establish wireless communication between a base station and one or more user equipment (UE) devices. Functions of the base station are disaggregated into a Radio Unit (RU) and one or more other units such as a Digital Unit (DU) and/or a Central Unit (CU).

In one embodiment, the RU is mainly responsible for lower level functions, such as implementing the air interface, with the DU and CU typically dedicated to management functions. A given DU or CU may be located many kilometers away from its associated RUs, with open protocols used as the fronthaul network between them. The open network introduces an unpredictable delay that may introduce uncertainty into any RTT measurement. To both allow the bulk of RTT processing to occur at the RU while eliminating the uncertainty of the open interface, a schedule that determines a timeslot for the RU to transmit a Positioning Reference Signal (PRS) is determined by the DU or CU and communicated to the RU. The schedule may also specify a time slot for a UE to transmit a Sounding Reference Signal (SRS).

The PRS signal is then transmitted by the RU to the UE at the specified transmit time, with the RU also observing the time when a response SRS is returned by the UE. The RU can then determine a time difference between when it sent the PRS and observed the SRS response. This RU time difference can be forwarded to the DU or CU.

The UE also determines its own internal delay, that is difference in time between when the UE received the PRS signal and when the UE subsequently transmitted a corresponding SRS response signal. The UE then forwards its internal delay value to the DU or CU.

At either the DU or CU, an estimate of the in-flight, Round Trip Time (RTT) between the RU and UE can be determined by subtracting the UE's internal delay value from the RU's observed time difference value.

With two or more of such RTT measurements, a position estimate for the UE can be determined, at least in part.

The PRS and/or SRS schedule may indicate a Physical Resource Block (PRB) that specifies a time slot and frequency at which the respective PRS signal and SRS signal are transmitted.

The RU may determine the observed time difference using an internal timer, or by comparing timestamps on the PRS and SRS signals. In some instances, where synchronization protocols are used between the RU and DU, and knowing the PRS scheduled time slot, a estimate of the fronthaul delay can be used to further refine the RTT estimate.

In some implementations, the UE may aggregate its responses to two or more PRS signals from two or more RUs, such that transmits only a single SRS reply.

BRIEF DESCRIPTION OF THE DRAWINGS

Additional novel features and advantages of the approaches discussed herein are evident from the text that follows and the accompanying drawings, where.

DETAILED DESCRIPTION OF PREFERRED EMBODIMENTS

Figure 1:
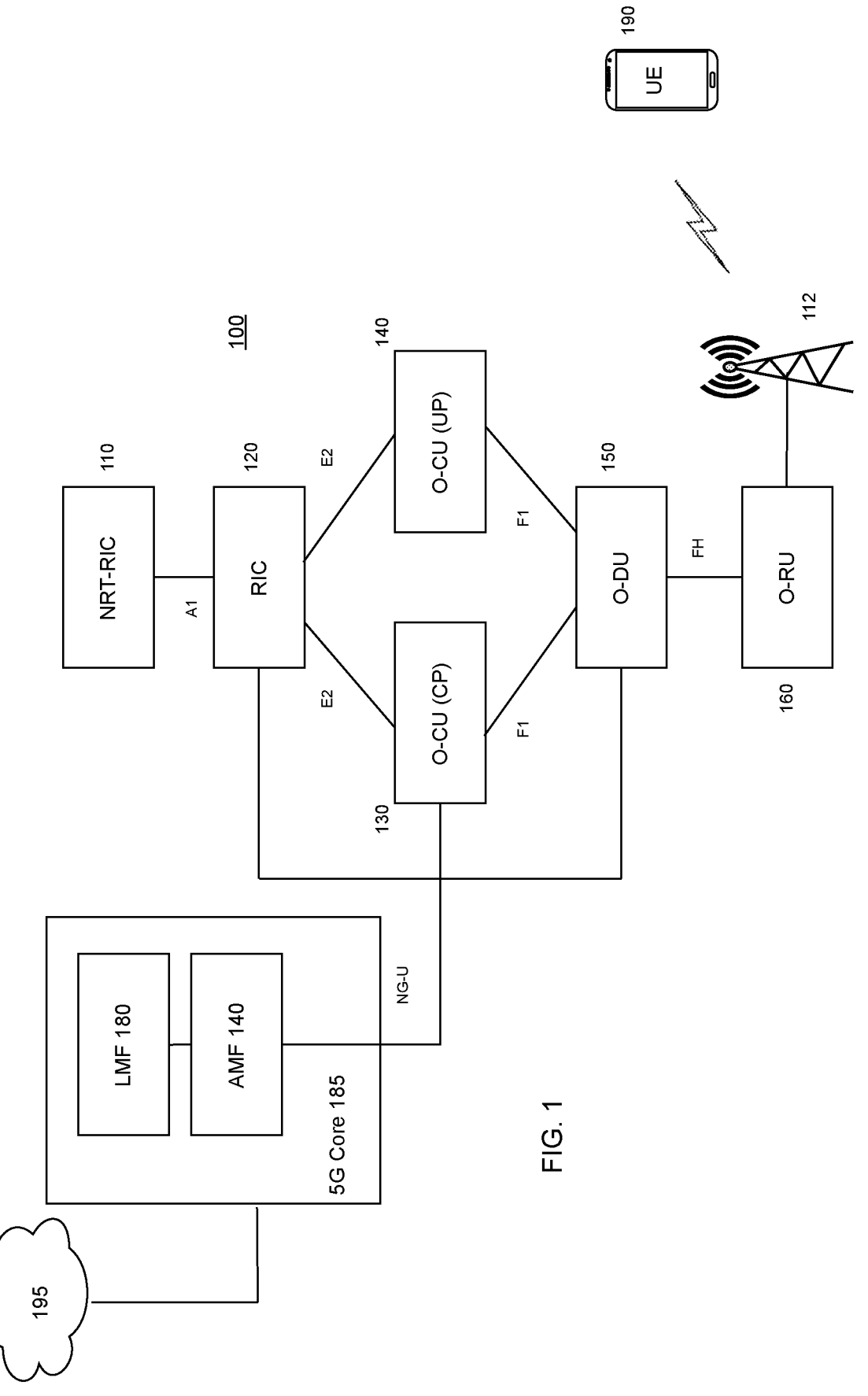
FIG. 1 is a block diagram of an example wireless communication system that includes Open Radio Access Network (O-RAN) components including an Open Radio Unit (O-RU), Open Data Unit (O-DU), and Open Control Unit (O-CU).

Preferred embodiments of the methods, apparatus and systems described herein provide for measuring Round Trip Time (RTT) within an Open Radio Access Node (ORAN) architecture where an Open Radio Unit (O-RU) coordinates with the function of other units (OUs) such as an Open Distributed Unit (O-DU) and/or Open Central Unit (O-CU).

The Round Trip Time (RTT)-based approach to location described herein has the base station transmit a known signal on the downlink, to which a mobile device sends a known configured reply on the uplink. The mobile device may also determine its own internal time delay, that is, the time between when it received the downlink signal and when it transmitted the configured reply on the uplink. The mobile may then also report this internal time delay to the base station. This approach enables the base station to determine the actual "in the air" round trip time by determining the difference between the time it transmitted on the downlink and received the configured reply on the uplink, and by also subtracting the delay introduced by the mobile device itself.

The introduction of Open RAN (O-RAN) base station architectures introduces a challenge to implementing known mobile location schemes, however. The Open Radio Access Network alliance (O-RAN Alliance), established by business operators and equipment providers, defines new wireless network elements (NEs) and interface standards. O-RAN defines a Radio unit (RU), a Distributed Unit (DU) (also referred to as the "Digital Unit"), a Central Unit-Control Plane (CU-CP), and a Central Unit-User Plane (CU-UP), which implement the existing 3GPP Evolved NodeB (eNB) or New Generation NodeB (gNB).

With this architecture, the O-RU is the radio unit that handles the digital front end (DFE) and lower parts of the Physical Layer, as well as the digital beamforming functionality.

The DU is a distributed unit that sits close to the RU and runs functions such as Radio Link Control (RLC), Media Access Control (MAC), and the upper parts of the Physical layer. Its operation is controlled by the CU.

The CU serves as a centralized unit that runs the Radio Resource Control (RRC) and Packet Data Convergence Protocol (PDCP) layers and other functions. A gNB may therefore consists of a CU and one DU connected to the CU for both the Control Plane (CP) and User Plane (UP) respectively. A CU with multiple DUs may support multiple gNBs. The CU is thus a logical node that includes the gNB functions such as transfer of user data, mobility control, RAN sharing, positioning, and session management. The CU may control the operation of several DUs.

O-RAN also defines a standardized Radio Access Network (RAN) intelligent controller (RIC) and a non-real-time RAN intelligent controller (NRT-RIC). Each of the O-DU and RIC, O-CU-CP and RIC, and O-CU-UP and RIC can be connected by Ethernet connections. In addition, higher layer open standards for communication between these elements include FrontHaul (FH), F1, E2, and A1 protocols.

To keep the O-RUs as simple as possible, it is desirable for the bulk of RTT processing to occur outside of the O-RU. However a given O-DU or O-CU may be located many kilometers away from its associated O-RUs, with higher layer "fronthaul" network infrastructure such as Ethernet routers connecting them. This inherent and unpredictable delay between the O-RU and O-CU or O-DU introduces uncertainty into any RTT measurement unless the system is carefully designed.

FIG. 1 is a view illustrating an Open Radio Access Network (O-RAN) network system according to some embodiment. An O-RAN network may utilize a cloud-native architecture that allows for mobile front-haul, mid-haul, and back-haul to be performed using cloud-computing principles. Therefore, rather than using specialized hardware to perform access network and core network functionality, more generalized purpose servers operating specialized software or firmware may be used for these components.

The illustrated O-RAN system logically separates functions of the Evolved Node B (eNB) or Next Generation Node B (gNB), disaggregating them into an NRT-RIC 110, an RIC 120, an O-CU-CP 130, an O-CU-UP 140, an O-DU 150, an O-RU 160, which are collectively referred to here as an O-RAN base station 100 that provides connectivity to other networks 195 through a 5G core 185.

The NRT-RIC 110 is a logical node that enables non-real-time control, optimization of RAN elements and resources, model training, update, and the like. The RIC 120 is a logical node that enables near-real-time control and optimization of RAN elements and resources, based on the data collected from O-DU 150, O-CU-CP 130, O-CU-UP 140, etc. through an E2 interface.

The O-CU, including the O-CU-CP 130 and the O-CU-UP 140, as mentioned briefly above, is a logical node that provides functions of radio resource control (RRC), service data adaptation protocol (SDAP), and packet data convergence protocol (PDCP) protocols. The O-CU-CP 130 is a logical node that provides functions of a control plane portion of RRC and PDCP, and the O-CU-UP 140 is a logical node that provides functions of a user plane portion of SDAP and PDCP. The O-CU-CP 130 is connected to an Access and Mobility Management Function (AMF) 140 and/or Location Management Function (LMF) 180 included in a 5G network core 185 through a next generation (NG) application protocol (NGAP) interface.

The specific functions and layers handed by O-CU-CP s 130, and O-CU-UP 140 may operate the Radio Resource Control (RRC) layer and Packet Data Convergence Protocol (PDCP) layer. The CUs 130, 140 can also be referred to as a local data center of the cellular network. In the hierarchy of a cellular network, CUs 130, 140 may sit between DUs 150 and a national or centralized data center.

The O-DU 150 is a logical node that provides Radio Link Control (RLC), Media Access Control (MAC), and higher physical layer (high-PHY) functions. Multiple O-RUs 160 may communicate with a single O-DU 150. The O-DU 150 functions as a logical node of the cellular network between O-RUs 160 and O-CUs 130, 140. Notably, the multiple O-RUs 160 that communicate with a single O-DU 150 may be made by different manufacturers. Since the base station 100 operates according to O-RAN, the cellular network can tolerate different make/model of O-RUs 160; therefore, the secondary operator is not restricted to using a particular make/model of O-RU 160 or O-DU 150.

An O-RU 160 serves as the interface between cellular network and implements wireless radio-based communications with UEs 190. O-RU 160 handles transmitting and receiving wireless communications with UEs 190 via one or more antennas located on tower 112. O-RU 160 can be located on or nearby tower 112. O-RU 160 handles transmitting and receiving data according to a particular wireless communication protocol, such as 3G, 4G LTE, 5G NR, or some future technology, such as 6G or beyond.

UEs 190 represent various forms of mobile wireless devices that can communicate using the cellular network. For example, mobile phones, smartphones, cellular modems, personal computers, wireless sensors, access points (APs), gaming devices, Internet of Things (IoT) devices, and any other 5G-equipped device may function as UEs 190.

Hereinafter, uplink (UL) refers to a radio link through which a UE 190 transmits data or control signals to base station 100, and downlink (DL) refers to a radio link through which base station 100 transmits data or control signals to a UE 190.

O-CUs 130, 140 may reach various other networks 195, such as the Internet and/or some other public or private network, via a 5G core network 185. In other embodiments, such networks 195 may be accessible directly by O-CUs 130, 140 and/or by O-DUs 150.

FIG. 1 shows each logical node with a singular number, but each logical node may be connected in plural. For example, a number of O-RUs 160 may be connected to one O-DU 150, and a number of O-DUs 150 may be connected to one O-CU-UP 140. Also, any given O-RU 160 may be communicating with many UEs 190.

By way of review, recent releases of 3GPP specify that RTT measurements may be determined by using certain specified downlink and uplink positioning reference signals. On the downlink, the gNb may transmit a Positioning Reference Signal (PRS), and on the uplink, the UE may transmit a Sounding Reference Signal (SRS).

3GPPP also specifies that UE will send to the gNb a value known as the UE Rx-Tx Time Difference, or $T\_rx\_tx\_ue$ time delay, which is the time difference between when the UE receives the downlink PRS and then transmits the SRS uplink signal. Furthermore, to determine the RTT, a gNb will then measure the elapsed time from transmitting a PRS to a UE and receiving an SRS signal back. By subtracting the $T\_rx\_tx$ time delay, and the delay value sent from the UE, the gNb may determine the total RTT from the gNb antenna to the UE. Furthermore, if gNb can determine its own internal delay between its transceiver and its antenna info, then that delay can be also subtracted to obtain the most accurate RTT measurement.

Before turning to a detailed discussion of how RTT determination may now be best split among the three disaggregated nNb entities, including the O-CU (CP) 130, O-DU 150 and O-RU 160, a discussion of some considerations is helpful. As compared to TDOA methods, a mobile device can be located with RTT delay measurements from as few as three or even two gNbs. With the RTT approach, synchronization across gNb's (that is, determination of the relative offset between gNB's) is also not necessary. This is because each gNb can measure RTT independently of the other gNBs. Furthermore, the RTT measurements from different gNB's need not be simultaneous. An accurate estimate of position will be obtained so long as the measurements are taken within 10's of milliseconds for most terrestrial-based mobile devices.

However, any approach should ensure that RTT measurement accuracy is independent of any fronthaul synchronization, especially Timing Error (TE) and jitter, between the O-DU and O-RU. Consideration should also be given to the fact that the ORAN standard functionality splits for the O-RU, 7.2x, does not specify when IQ data sent to the O-RU corresponds to a PRS signal. The PRS signal is generated and encoded in the O-DU and sent to the O-RU as IQ data, which the O-RU transmits to a UE. The SRS signal can be extracted by the O-RU, however, as it is just sent to the O-DU as IQ data for further uplink processing, e.g. SRS-based channel estimation, and therefore it is not treated as time-critical data between O-RU and O-DU. In addition, Timing Error (TE) in the fronthaul connection between the O-RU and O-DU, is not sufficiently predictable. If the location processing is performed solely in the O-RU or O-DU, therefore, high accuracy geolocation using RTT measurements may not be possible. While adding GPS or GNSS capability to the O-RU might improve accuracy, that approach would increase the O-RU's cost and complexity.

Figure 2:
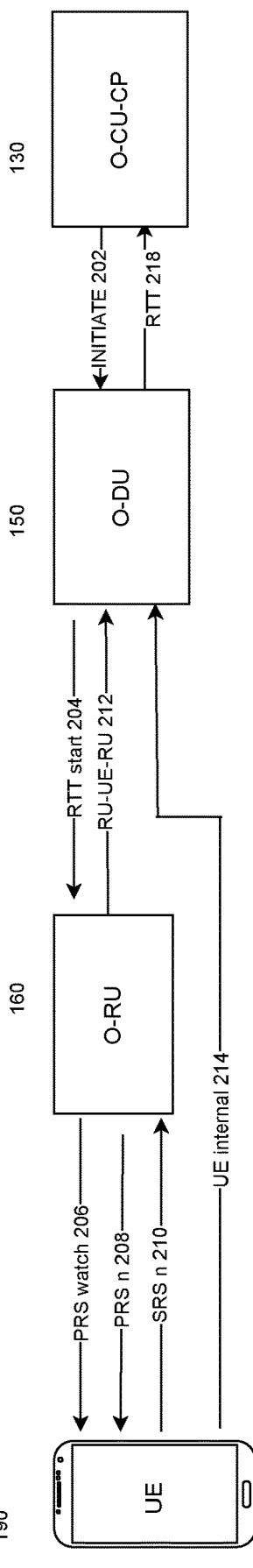
FIG. 2 illustrates one process for determining Round Trip Time using the O-RAN components of FIG. 1.

FIG. 2 is a high level depiction of how RTT can be accurately determined with processing split among O-RAN's three disaggregated nNb entities, including the O-CU-CP 130, O-DU 150 and O-RU 160.

Focusing most of the responsibility for timing measurement within the O-RU 160 avoids introducing the Timing Error (TE) of its Fronthaul (FH) interface with the O-DU 150. This arrangement also avoids the need for GPS time stamping of positioning reference signals (such as PRS and SRS) which might otherwise be necessary.

Generally speaking, upon an initial request from O-CU to the O-DU 150, the O-DU 150 may ask the O-RU 160 to initiate a local timer. This request may then also prompt the transmission of a request signal (such as a 3GPP-defined PRS signal as encoded by the O-DU 140) on the downlink. The UE then responds with an uplink signal (such as a 3GPP-definged SRS signal). The uplink SRS transmission is then detected by the O-RU 160 and the time difference information between the transmitted PRS and received SRS is sent to the O-DU 150 through the fronthaul (FH) network. The O-DU then forwards the O-RUs PRS-SRS time difference measurement as a response to the O-CU-CP 130. With this approach, the O-DU 150 retains management responsibility (through control or management plane messaging) for dictating when the RTT measurements will be taken, and also retains responsibility for the scheduling of the PRS and SRS signals, although the O-RU still retains responsibility for the timing aspects—and controls exactly when they are transmitted and detected.

More particularly, the O-CU-CP 130 may first send a request to the O-DU 150 at state 202, which in turn causes the O-DU 150 to forward the request to the O-RU 160 at state 204. This in turn informs the O-RU 160 to prepare to perform an RTT measurement. This may take the form of a control plane "RTT start" message from the O-DU 150 to the O-RU 160. That message instructs the O-RU 160 to transmit a particular signal at state 206, which may be a particular downlink Positioning Reference Signal (PRS) watch signal as encoded by the O-DU 150. The PRS signals may be transmitted to the UE 190 using a particular Physical Resource Block (PRB) that specifies a time and frequency.

The RTT start message also informs the O-RU 160 to start its timer when it will eventually transmit a PRS n signal, and stop the local timer when it sees a reply on the uplink such as a specific Sounding Reference Signal (SRS) (here depicted as SRS n). This also causes the O-RU to report back the time delay it measured to the O-DU 150.

With this approach, even if the O-DU 150 is not in close synchronization with the O-RU 160, because O-RU 160 is running its own clock, the O-DU 150 can be assured that the RTT measurement is accurate.

At state 206, the O-DU 150 also informs the target UE 190 to send a specific SRS n reply in the uplink when the UE 190 receives the specific PRS n. This "PRS watch" message, or configuration, can be sent over a Layer 3 message between the O-CU-CP and UE, without involving the O-RU, other than the O-RU transmitting this information as part of the Physical Uplink Control Channel "PUCCH" IQ data. By doing so, the O-DU 150 retains control over scheduling decisions.

At state 208 the O-RU subsequently sends the actual PRS n message and the UE 190 detects it. At state 210 the UE 190 transmits the reply SRS n message.

The O-RU 160 then detects the reply SRS n message sent by the UE 190, and at state 212 it can then forward to the O-DU 150 its measured downlink-to-uplink round trip time value (T_tx_rx_ru) by comparing the difference in time between the occurrence of states 208 and 210. This data value can be sent using either a control plane or management plane message.

The UE 190 also separately sends, at state 214, to the O-DU (via U-plane IQ data corresponding to the measurement report data sent over the air interface) its measured internal delay as a T_rx_tx_ue data value. This is measured by the UE 190 as the difference between when it received the PRS n at state 208 and transmitted the SRS n at state 210. This value can be reported via a UE measurement report as a Layer 3 message. With this approach, the OR-U 160 does not need to be informed of this value, since it is the O-DU performing the RTT calculation in state 216.

The O-DU can then determine the target UE's RTT by subtracting T_rx_tx_ue from T_tx_rx_ru, in other words, $$RTT = T - Tx\_rx\_ru - T\_rx\_tx\_ue$$

The RTT can then be reported to the O-CU-CP 130 in state 218.

It should be noted in the scenario above, the O-RU 160 and UE 190 may report their timing data values T_tx_rx_ru and T_rx_tx_ue to the O-CU-CP 130 instead of the O-DU 150. In that instance, the O-CU-CP 130 may instead perform the RTT calculation.

Figure 3:
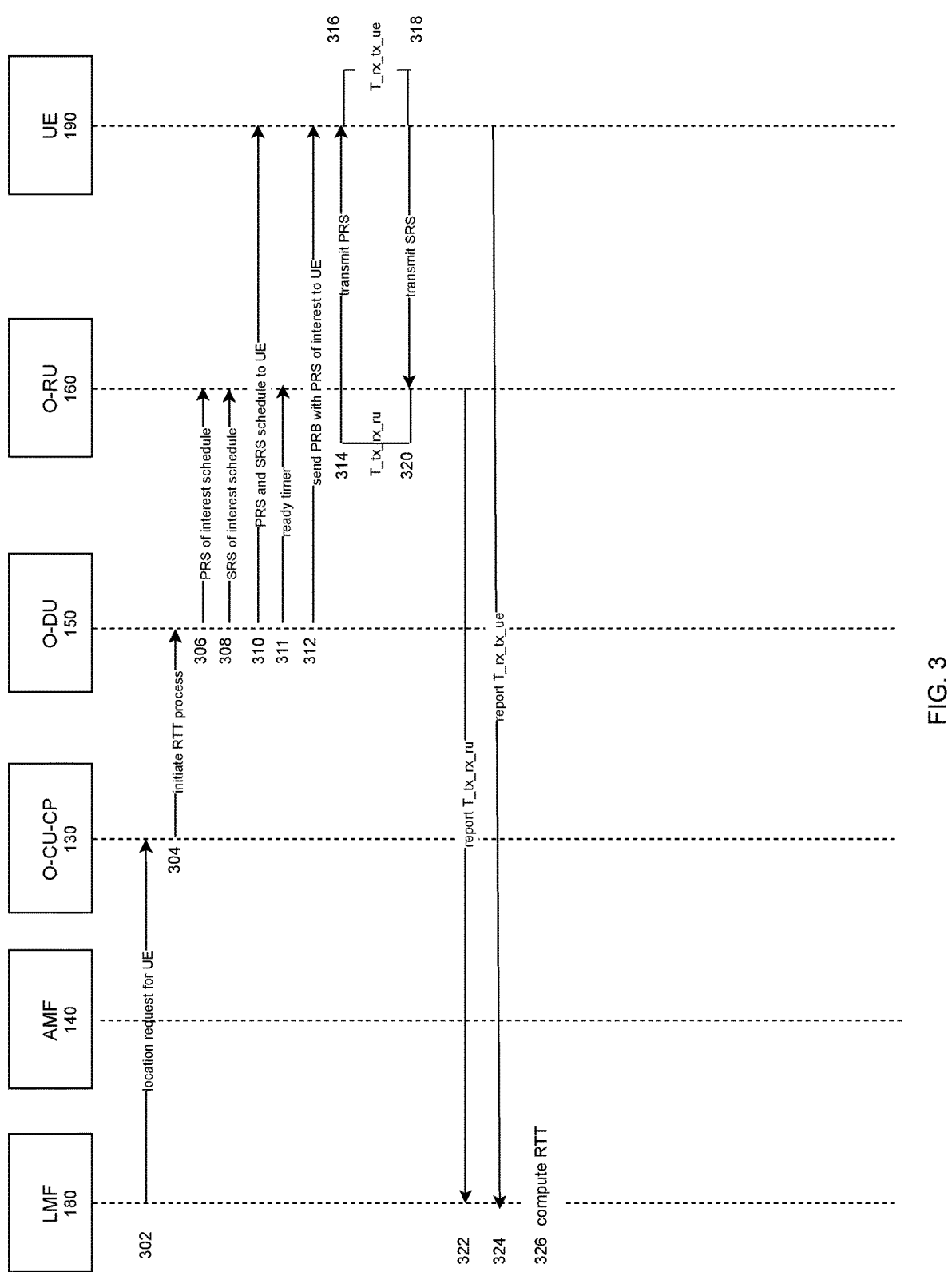
FIG. 3 illustrates another process for RTT determination initiated by a Location Management Function (LMF).

FIG. 3 illustrates an approach that involves still other entities in the RTT determination process with greater control over the scheduling of measurements.

Here, a Location Management Function (LMF) 180 element sends the initial location request, through am Access and Mobility Function (AMF) 140, to the O-CU-CP 130 in state 302. This request may be sent over an NL1 and N2/NG-C interface and indicate that it is a request for the location of a particular UE 190. The particular UE 190 may be identified by its International Mobile Equipment Identifier (IMEI) or some other identifier.

Next, in state 304, the O-CU-CP 130 sends a message to the O-DU 150 to indicate the initiation of an RTT measurement process for the specific UE of interest. This RTT request may typically be sent to a single O-RU 160, such as the O-RU 160 of the cell serving the UE 190. It should be noted that as part of typical location processing, the LMF 180 may need more than one RTT measurement from the O-RUs of serving and neighboring cells. Thus, the LMF 180 may also initiates the RTT procedure in multiple neighboring cell's O-RUs managed by the O-DU, in addition to the serving the O-RU's 160. The LMF 180 may also initiate RTT requests to more than one O-DU that may manage multiple neighboring cell's O-RUs in addition to the serving cell's O-RU.

In states 306 and 308 the O-DU 150 determines appropriate scheduling of particular PRS n and SRS n signals. The scheduling may include allocating a Physical Resource Block (PRB) for the PRS n and SRS n signal, where the PRB defines both a timeslot and particular subcarrier frequency for the transmission of each signal. These schedules are sent to the O-RU 160, such as via a control plane message or management plane message.

In state 310 the O-DU 150 causes PRS and SRS scheduling messages to be sent to the UE 190, for example as a Layer 3 or reporting control message. The UE thus receives the PRS and SRS scheduling information.

In state 311, the O-RU 160 is instructed to set its internal T_tx_rx_ru timer to be ready to start at the timeslot scheduled for when the PRS n of interest (PRS n) will be presented on its antenna.

In state 312, the O-DU 150 initiates transmission of the encoded PRS n at its assigned timeslot and frequency. The O-RU 160 then knows to start its T_tx_rx_ru timer in this same timeslot.

In state 314, the encoded PRS n signal is transmitted through the O-RU to the UE 190, and the O-RU starts running the timer T_rx_rx_ru.

In state 316, the UE receives the PRS n of interest, and starts its T_rx_tx_ue timer. The UE can know when to expect to start its internal timer as it was informed of the expected timeslot for the PRS n in state 310. However the timer does not actually start running until the PRS n signal is detected.

In state 318, the UE 190 transmits the SRS n signal and stops its internal timer. The SRS n signal may be sent using the PRB allocated in state 308 and to which the UE 190 was informed in state 310. The UE 190's internal timer now contains an estimate of its internal delay T_rx_tx_ue representing the time between when it received PRS n and time the UE transmitted the reply SRS n.

In state 320 the O-RU 160 receives the SRS n transmitted from the UE 190 and stops its T_tx_rx_ru timer. The O-RU now has an estimate of the observed total round trip time in state 321.

In state 322 the O-RU 160 can report the T_tx_rx_ru value to the LMF 180.

In state 324, the UE 190 then sends, to the LMF 180, its internal T_rx_tx_ue time delay.

In state 326 the LMF 180 has received both the T_tx_rx_ru and T_rx_tx_ue delay values, and thus can now compute the RTT value(s).

Optional Procedures with O-DU Estimated PRS Timestamp

With the above approach, since the O-DU 150 schedules the PRS transmission, the O-DU may determine the expected time that the PRS transmission will appear at the O-RU antenna, even accounting for the delay on the Fronthaul (FH) interface (see FIG. 1).

More particularly, certain O-RAN fronthaul specifications support protocols such as Precision Time Protocol (PTP) or SyncE that achieve high-accuracy synchronization. These protocols may be used to synchronize the O-RU 160 side with a high-performance clock available at the O-DU 150 side. The resulting "radio frame-to-network-time" difference, as experienced on the fronthaul, can thus be determined from these protocols. That fronthaul delay value can then be factored into by the O-DU 150 to arrive at an estimate of the difference between when it requests the PRS to be sent and when the PRS actually appears on the O-RU's antenna.

In one example, the O-DU 150 or O-CU-CP 130 may thus determine the RTT using the estimated transmission time of a scheduled PRS at an O-RU 160 (t_prs_est), the O-RU's timestamp of the received SRS n of interest, t_srs, and the UE's 190 reported T_rx_tx_ue time delay using the following equation:

$$T\_tx\_rx\_ru = t\_srs - t\_prs\_est$$

The O-DU may send this measurement back to the AMF 180 to compute the RTT as described above.

O-RU Measurement Procedure with Multiple PRS but Single SRS

In the approach described in connection with FIG. 3, it was understood that separate PRS messages would be sent for each of multiple O-RU's 160 with a requirement for the UE 190 to respond with an SRS for each such PRS that it detects. However, in another approach, the system may accommodate transmission of multiple PRS signals but with a single SRS response.

Figure 4:
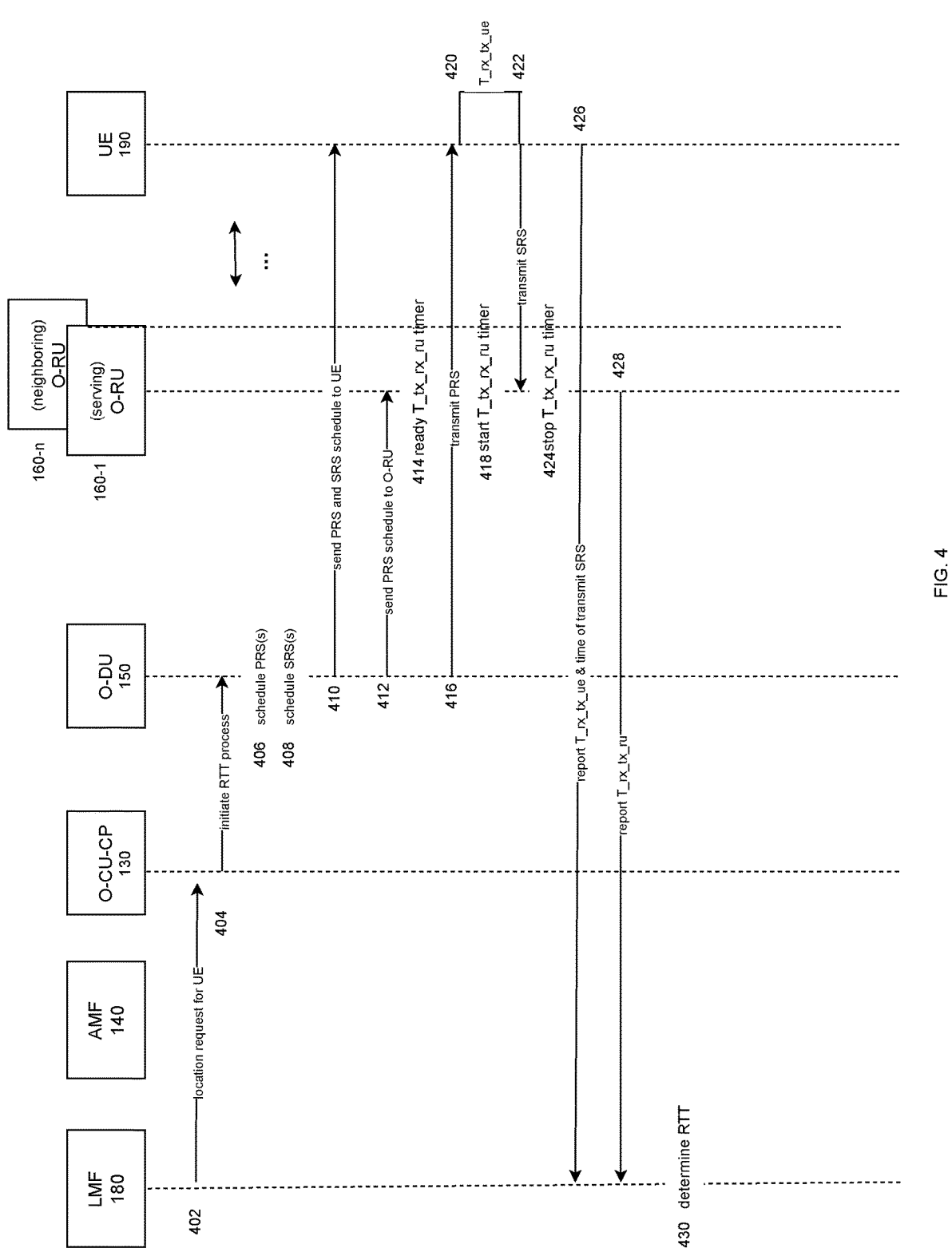
FIG. 4 illustrates yet another process where multiple O-RU's transmit timing reference signals.

FIG. 4 is an example of this process. Similar to the process of FIG. 3, this process begins in state 402 with the LMF 180 sending, through AMF 140, an initial request to the O-CU-CP 130, possibly over the NL1 and N2/NG-core interface, to return position information for a particular UE 190.

In state 404 the O-CU-CP 130 indicates initiation of an RTT measurement process to the O-DU 150.

Next at 406 and 408 the O-DU 150 determines appropriate Physical Resource Blocks (PRBs) during which PRS and SRS signals will be scheduled. These PRBs may be scheduled for one or more O-RUs 160, including the serving and neighboring O-RUs 160.

In state 410 the O-DU 150 sends this PRS and SRS scheduling information to the UE 190, such as through a Layer 3 management plane message. This may include the PRS schedule for one or more O-RUs 160. This allows the UE 190 to be aware that it may see PRS transmissions from both its serving O-RU 160 and neighboring O-RUs 160. The O-DU message(s) to the UE 190 may also include a request to the UE to identify the origin of each PRS signal it receives, that is, whether the PRS signal corresponds to the serving cell or a neighboring cell.

In state 412 the OD-U-CP 130 shares the scheduling information for one or more PRS's to one or more O-RUs 160, such as via control plane or management plane messages.

Next, in state 414 the O-RU(s) 160 (which may include the serving O-RU and neighboring O-RUs) receive the PRS of interest schedule and ready their respective T_tx_rx_ue timer(s) to start when the respective PRS will be presented on its antenna.

At state 416 each O-RU 160 receives the PRS of interest (such as in the form of IQ data from the O-DU U-plane data) and at state 418 starts its T_tx_rx_ru timer.

At state 420 the target UE receives the PRS(s) of interest from one or more O-RUs 160, starts a T_rx_tx_ue timer for one or more of them, and sends the SRS at state 422.

At state 422 each O-RU 160 receives SRS transmitted from UE and at state 424 each O-RU 160 stops its respective T_tx_rx_ru timer.

In state 426, the UE 190 sends to the LMF 180, as a single measurement report message, the one or more measured T_rx_tx_ue time delays between receiving each the PRS of interest from one or more O-RUs 160. This message may also include a timestamp for when the UE 190 transmitted the SRS.

At state 428, the LMF 180 receives the one or more T_tx_rx_ru time delay values from each of the one or more O-RUs 160. These may originate from each O-RU as separate management plane messages, then may be forwarded from the O-DU to LMF 180.

At 430, the LMF 180 can then determine the RTT between the UE 190 and one or more O-RUs 160 as:

$$UE\_RTT\_i = T\_tx\_rx\_ru\_i - T\_rx\_tx\_ue\_i,$$

where T_tx_rx_ru_i is the T_tx_rx from the ith O-RU 160 and T_rx_tx_ue_i is the T_rx_tx_ue corresponding to the PRS transmitted from ith O-RU 160.

Alternatively, the ith O-RU may send the timestamp information, i.g. t_srs_i and t_prs_i, to the O-DU where the O-DU will determine the value of T_tx_ru_i based on the equation T_tx_rx_ru_i=t_SRS_i−t_prs_i, which is then sent from O-DU to LMF 180 for RTT computation, as described above. Alternatively, the ith O-RU may send the timestamp information, i.g. t_srs_i and t_prs_i, to the O-CU where the O-CU will determine the value of T_tx_ru_i based on the equation T_tx_rx_ru_i=t_SRS_i−t_prs_i, which is then sent from O-CU to LMF 180 for RTT, as described above.

Optional Implementations Using O-RU Timestamps

Other variations on the approaches described above are possible.

For example, the O-RU 160 may optionally provide to the O-DU 150 a timestamp of the time instance, t_prs, when the PRS of interest signal was presented on its antenna, such as a time stamp based on its own local clock. This may be in lieu of running a separate timer.

The O-RU 160 may also timestamp a time instance, t_srs, based on its internal clock when the SRS of interest signal is received at its antenna.

The O-RU 160 may then send one or both of these timestamp values, t_prs and t_srs, as part of its timing report to the O-DU 150 (e.g., as part of state 322 of FIG. 3 or state 426 of FIG. 4).

In this approach, the O-DU 150 may then compute the difference in the O-RU's transmit and receive time as T_tx_rx_ru=t_srs−t_prs. The O-DU can then send the computed T_tx_rx_ru value to the LMF 180.

Optionally, O-RU 160 may instead itself calculate the difference in the time stamp values, as T_tx_rx_ru=t_srs−t_prs, and report that value to the O-DU 150, which may then send it to the LMF 180.

In another embodiment, the O-RU 160 may report, to O-DU 150 or O-CU-CP 130, its internal delay time between when it exactly receives the PRS IQ data from the O-DU, upconverts the IQ data to the PRS radio frequency (RF) signal, and transmits the PRS RF at its transmit antenna, and the time delay between when it receives the SRS at its antenna and extracts the SRS IQ data from the received RF. This can further maximize the accuracy of the RTT measurement.

Optionally, the O-RU may apply other of its internal delay values as part of its T_tx_rx_ru reported value.

Other Implementation Options

An example functional block shown and described herein may include memory resources and processing resources. The memory resources and processing resources may be implemented as one or more special-purpose or general-purpose processors. Such special-purpose processors may include processors that are specifically designed to perform the functions detailed herein. The special-purpose processors may be Application Specific Integrated Circuits (ASIC)s or Field Programmable Gate Arrays (FPGA)s which are general-purpose components that are physically and electrically configured to perform the functions detailed herein. General-purpose processors may execute special-purpose software that is stored using one or more memory resources such as non-transitory processor-readable mediums, including random access memory (RAM), flash memory, a hard disk drive (HDD), or a solid state drive (SSD).

The disclosure is not limited by the name of each node described above, and in the case of a logical node or entity performing the above-described function, the configuration of the disclosure may be applied. In addition, the different logical nodes may be physically located in the same location or different locations, and may be provided with a function by the same physical device (e.g., a processor, a controller, etc.) or by another physical device. As an example, the function of at least one logical node described herein may be provided through virtualization in one physical device.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional states or steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may the execute the program code to perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

The above description has particularly shown and described example embodiments. However, it will be understood by those skilled in the art that various changes in form and details may be made therein without departing from the legal scope of this patent as encompassed by the appended claims.

The invention claimed is:
1. A method for wireless communication, comprising:
establishing wireless communication between a base station and a User Equipment (UE) device, wherein functions of the base station are further disaggregated into a Radio Unit (RU) and one or more Other Units (OUs), the one or more OUs including at least one Digital Unit (DU) or at least one Central Unit (CU);
communicating between the RU and the one or more OUs via one or more open interfaces;
determining, at one of the OUs, a schedule for the RU to transmit a Positioning Reference Signal (PRS);
determining, at one of the OUs, a schedule for the UE to transmit a Sounding Reference Signal (SRS);
transmitting, by the RU, the PRS signal;
receiving, by the UE, the PRS signal;
subsequently transmitting, by the UE, the SRS signal;
determining, by the UE, a UE internal delay value that depends on a time difference between the UE receiving the PRS signal and the UE subsequently transmitting the SRS signal;
receiving, by the RU, the SRS signal;
forwarding, by the UE to one of the OUs, the UE internal delay value;
forwarding, by the RU an RU time difference value that depends on a difference between the RU transmitting the PRS signal and the RU receiving the SRS signal;
determining a Round Trip Time (RTT) value by subtracting the UE internal delay value from the RU time difference value, wherein the step of determining the RTT value further adjusts the RTT value by an estimate of a fronthaul delay between the RU and at least one OU, and the RU and at least one OU participate in a synchronization protocol that provides the estimate of the fronthaul delay; and
determining a position of the UE at least in part from the RTT value.
2. The method of claim 1 wherein the OU includes a DU, and the DU performs the step of determining the RTT value.
3. The method of claim 1 wherein the OU includes a CU, and the CU performs the step of determining the RRT value.
4. The method of claim 1 wherein the base station further comprises a Location Management Function (LMF) and the LMF performs the step of determining the RTT value.
5. The method of claim 1 additionally comprising:
starting, by the RU, a timer after the step of transmitting the PRS signal;
stopping, by the RU, the timer after the step of receiving the SRS signal; and
determining the RU time difference value from the timer.
6. The method of claim 1 additionally wherein:
the PRS signal and SRS signal each include a time stamp that depends on a time of their respective transmission; and
determining the RU time difference by comparing the time stamps.
7. The method of claim 1 additionally comprising:
transmitting, by one of the OUs to the UE, the schedule for the PRS and the schedule for the SRS; and
further estimating, by the UE, the time difference between the UE receiving the PRS signal and the UE subsequently transmitting the SRS signal, by using the schedules.

8. The method of claim 1 wherein two or more RUs communicate with the one or more OU and the method further comprises:

transmitting two or more PRS signals from the two or more RUs;

receiving, by the UE, the two or more PRS signals; and transmitting, by the UE, a single SRS signal in response to receiving the two or more PRS signals.

9. A wireless communication apparatus comprising:

a transceiver configured to transmit and receive signals between a base station and a User Equipment (UE) device;

one or more processors coupled to the transceiver; and one or more computer readable media including instructions that, when executed by the one or more processors, cause the one or more processors to perform a process for:

disaggregating functions of the base station into a Radio Unit (RU) and one or more Other Units (OUs), the one or more OUs including at least one Digital Unit (DU) or at least one Central Unit (CU);

communicating between the RU and the one or more OUs via one or more open interfaces;

determining, at one of the OUs, a schedule for the RU to transmit a Positioning Reference Signal (PRS);

determining, at one of the OUs, a schedule for the UE to transmit a Sounding Reference Signal (SRS);

transmitting, by the RU, the PRS signal;

receiving, by the UE, the PRS signal;

subsequently transmitting, by the UE, the SRS signal;

determining, by the UE, a UE internal delay value that depends on a time difference between the UE receiving the PRS signal and the UE subsequently transmitting the SRS signal;

receiving, by the RU, the SRS signal;

forwarding, by the UE to one of the OUs, the UE internal delay value;

forwarding, by the RU an RU time difference value that depends on a difference between the RU transmitting the PRS signal and the RU receiving the SRS signal;

determining a Round Trip Time (RTT) value by subtracting the UE internal delay value from the RU time difference value, wherein the determining the RTT value further adjusts the RTT value by an estimate of a fronthaul delay between the RU and at least one OU, and the RU and at least one OU participate in a synchronization protocol that provides the estimate of the fronthaul delay; and determining a position of the UE at least in part from the RTT value.

10. The apparatus of claim 9 wherein the OU includes a DU, and the DU performs the step of determining the RTT value.

11. The apparatus of claim 9 wherein the OU includes a CU, and the CU performs the step of determining the RRT value.

12. The apparatus of claim 9 wherein the base station further comprises a Location Management Function (LMF) and the LMF performs the step of determining the RTT value.

13. The apparatus of claim 9 wherein the one or more processors are further for:

starting, by the RU, a timer after the step of transmitting the PRS signal;

stopping, by the RU, the timer after the step of receiving the SRS signal; and determining the RU time difference value from the timer.

14. The apparatus of claim 9 additionally wherein:

the PRS signal and SRS signal each include a time stamp that depends on a time of their respective transmission; and determining the RU time difference by comparing the time stamps.

15. The apparatus of claim 9 wherein the one or more processors are further for:

transmitting, by one of the OUs to the UE, the schedule for the PRS and the schedule for the SRS; and further estimating, by the UE, the time difference between the UE receiving the PRS signal and the UE subsequently transmitting the SRS signal, by using the schedules.

16. The apparatus of claim 9 wherein two or more RUs communicate with the one or more OU and the one or more processors are further for:

transmitting two or more PRS signals from the two or more RUs;

receiving, by the UE, the two or more PRS signals; and transmitting, by the UE, a single SRS signal in response to receiving the two or more PRS signals.

* * * * *